United States Patent
Wu et al.

(10) Patent No.: US 12,415,339 B2
(45) Date of Patent: Sep. 16, 2025

(54) RESIN COMPOSITION AND METAL CLAD SUBSTRATE

(71) Applicant: ITEQ CORPORATION, Hsinchu County (TW)

(72) Inventors: Sheng-Yen Wu, Hsinchu County (TW); Kai-Yang Chen, Hsinchu County (TW); Meng-Han Yeh, Hsinchu County (TW); Li-Chung Lu, Hsinchu County (TW)

(73) Assignee: ITEQ CORPORATION, Hsinchu County (TW)

( * ) Notice: Subject to any disclaimer, the term of this patent is extended or adjusted under 35 U.S.C. 154(b) by 529 days.

(21) Appl. No.: 18/146,382

(22) Filed: Dec. 25, 2022

(65) Prior Publication Data
US 2024/0017525 A1  Jan. 18, 2024

(30) Foreign Application Priority Data
Jul. 12, 2022 (TW) .................................. 111126000

(51) Int. Cl.
*B32B 15/08* (2006.01)
*C08L 79/04* (2006.01)

(52) U.S. Cl.
CPC .............. *B32B 15/08* (2013.01); *C08L 79/04* (2013.01); *B32B 2250/02* (2013.01); *B32B 2457/08* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 2013/0161080 A1* | 6/2013 | Lin | ..................... | C08G 59/4284 523/400 |
| 2013/0316155 A1* | 11/2013 | Li | ........................... | C08L 65/00 524/508 |
| 2016/0060429 A1* | 3/2016 | Kitai | ....................... | C08L 63/00 523/451 |
| 2017/0101532 A1* | 4/2017 | Shimono | ................. | C08G 73/06 |
| 2018/0371243 A1* | 12/2018 | Hu | ........................... | B32B 5/024 |
| 2021/0108076 A1* | 4/2021 | Shen | ........................ | B32B 5/26 |
| 2025/0206915 A1* | 6/2025 | Takamura | ................ | C08J 5/244 |

OTHER PUBLICATIONS

Sponton et al. NPL article (Polymer Deg. and Stab., 94, 2009, 1693-1699. (Year: 2009).*
Haubold et al. (Polymers, 2022, 14, 606, 14 pages. (Year: 2022).*

* cited by examiner

*Primary Examiner* — Kevin M Bernatz
(74) *Attorney, Agent, or Firm* — Li & Cai Intellectual Property Office (57) ABSTRACT

A resin composition and a metal clad substrate are provided. The resin composition includes: 20 phr to 40 phr of an epoxy resin, 40 phr to 60 phr of a modified benzoxazine resin, 2 phr to 10 phr of a maleimide resin, and 25 phr to 50 phr of fillers. The modified benzoxazine resin contains a DOPO group. Based on a total weight of the modified benzoxazine resin being 100 wt %, an amount of the DOPO group ranges from 10 wt % to 20 wt %.

10 Claims, 5 Drawing Sheets

RESIN COMPOSITION AND METAL CLAD SUBSTRATE

CROSS-REFERENCE TO RELATED PATENT APPLICATION

This application claims the benefit of priority to Taiwan Patent Application No. 111126000, filed on Jul. 12, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a resin composition and a metal clad substrate, and more particularly to a resin composition and a metal clad substrate that do not give an oily substance at a high temperature.

BACKGROUND OF THE DISCLOSURE

A benzoxazine resin is a thermosetting resin which has a structure similar to that of a phenolic resin. In addition, the benzoxazine resin has properties that are superior to those of the conventional phenolic resin. For example, the benzoxazine resin has a low moisture absorption rate, strong mechanical strength and good dielectric properties.

During a solidifying process, there is no small molecular by-product emerged from the benzoxazine resin. Moreover, the benzoxazine resin has small volume shrinkage after being solidified. Therefore, the benzoxazine resin can be widely applied in many fields (especially for manufacturing a metal clad substrate), and can be mixed with other resins.

DOPO (9,10-dihydro-9-oxa-10-phosphaphenanthrene 10-oxide) is a flame retardant which has good thermal resistance and flame resistance. The DOPO flame retardant can be mixed with other thermosetting resins, inorganic fillers, or fibers, so as to form a composite material. Conventionally, such a composite material (containing the DOPO flame retardant) is usually used to manufacture the metal clad substrate.

However, the DOPO flame retardant may undergo a pyrolysis process at a high temperature environment. Due to thermal cracking of the DOPO flame retardant, phosphates (such as phosphoric acid, metaphosphoric acid, or pyrophosphoric acid) are generated. These phosphates tend to react with copper, and an oily substance emerges from a surface of the metal clad substrate, thereby negatively affecting the quality of the metal clad substrate.

Therefore, how to enhance the thermal resistance and the flame resistance of the metal clad substrate and prevent emergence of the oily substance by adjusting the components has become one of the important issues to be solved in the industry.

SUMMARY OF THE DISCLOSURE

In response to the above-referenced technical inadequacies, the present disclosure provides a resin composition and a metal clad substrate.

In one aspect, the present disclosure provides a resin composition. The resin composition includes: 20 phr to 40 phr of an epoxy resin, 40 phr to 60 phr of a modified benzoxazine resin, 2 phr to 10 phr of a maleimide resin, and 25 phr to 50 phr of fillers. The modified benzoxazine resin contains a DOPO group. Based on a total weight of the modified benzoxazine resin being 100 wt %, an amount of the DOPO group ranges from 10 wt % to 20 wt %.

In certain embodiments, the modified benzoxazine resin contains 1 wt % to 2 wt % of phosphorus atoms.

In certain embodiments, the modified benzoxazine resin is polymerized from a DOPO-containing compound, a diisocyanate compound, and a benzoxazine resin.

In certain embodiments, the DOPO-containing compound is grafted onto a main chain of the benzoxazine resin via the diisocyanate compound.

In certain embodiments, the DOPO-containing compound contains 6 wt % to 12 wt % of phosphorus atoms.

In certain embodiments, the DOPO-containing compound is represented by Formula (I):

Formula (I)

In certain embodiments, the diisocyanate compound is selected from the group consisting of: isophorone diisocyanate, 4,4'-diisocyanate dicyclohexylmethane, hexamethylene diisocyanate, and any combination thereof.

In certain embodiments, the benzoxazine resin is selected from the group consisting of: a bisphenol A modified benzoxazine resin, a bisphenol F modified benzoxazine resin, a diamine modified benzoxazine resin, and any combination thereof.

In certain embodiments, the modified benzoxazine resin has a substituent represented by Formula (II):

Formula (II)

In another aspect, the present disclosure provides a metal clad substrate. The metal clad substrate includes a metal substrate, a solidified body, and a printed circuit board. The solidified body is disposed on the metal substrate, and the printed circuit board is disposed on the solidified body. The solidified body is formed after solidification of a resin composition, and the resin composition includes: 20 phr to 40 phr of an epoxy resin, 40 phr to 60 phr of a modified benzoxazine resin, 2 phr to 10 phr of a maleimide resin, and 25 phr to 50 phr of fillers. The modified benzoxazine resin contains a DOPO group. Based on a total weight of the modified benzoxazine resin being 100 wt %, an amount of the DOPO group ranges from 10 wt % to 20 wt %.

Therefore, in the resin composition and the metal clad substrate provided by the present disclosure, by virtue of "the resin composition including 40 phr to 60 phr of a modified benzoxazine resin," "the modified benzoxazine resin containing a DOPO group," and "an amount of the DOPO group ranging from 10 wt % to 20 wt %," an oily substance can be prevented from emerging from a surface of the metal clad substrate.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A solidified body and a metal clad substrate of the present disclosure are made from a resin composition. The solidified body made from the resin composition has good thermal resistance. Even at a high temperature environment, no oily substance emerges from a surface of the solidified body, such that the solidified body can be used as one of the materials for manufacturing the metal clad substrate.

In the present disclosure, the resin composition includes: 20 phr to 40 phr of an epoxy resin, 40 phr to 60 phr of a modified benzoxazine resin, 2 phr to 10 phr of a maleimide resin, and 25 phr to 50 phr of fillers. Therefore, the resin composition and the metal clad substrate can have good thermal resistance and good flame resistance, and no oily substance emerges from a surface of the metal clad substrate at a high temperature.

It should be noted that the modified benzoxazine resin of the present disclosure contains a DOPO (9,10-dihydro-9-oxa-10-phosphaphenanthrene 10-oxide) group. Due to an addition of the modified benzoxazine resin, the thermal resistance and the flame resistance of the resin composition and the metal clad substrate can be enhanced, thereby improving performance of the metal clad substrate.

Specifically, based on a total weight of the modified benzoxazine resin being 100 wt %, an amount of the DOPO group ranges from 10 wt % to 20 wt %. In an exemplary embodiment, the amount of the DOPO group can be 12 wt %, 14 wt %, 16 wt %, or 18 wt %. Preferably, the amount of the DOPO group ranges from 15 wt % to 19 wt %.

In order to ensure that the resin composition and the metal clad substrate have good thermal resistance and good flame resistance, based on a total weight of the modified benzoxazine resin being 100 wt %, the modified benzoxazine resin contains 1 wt % to 2 wt % of phosphorus atoms. Preferably, the modified benzoxazine resin contains 1.1 wt % to 1.5 wt % of the phosphorus atoms.

In an exemplary embodiment, the modified benzoxazine resin is polymerized from a DOPO-containing compound, a diisocyanate compound, and a benzoxazine resin.

In a molecular structure of the modified benzoxazine resin, the DOPO-containing compound is grafted onto a main chain of the benzoxazine resin via the diisocyanate compound. In other words, two isocyanate groups of the diisocyanate compound are bonded to the DOPO-containing compound and the benzoxazine resin, respectively.

Specifically, the DOPO-containing compound contains 6 wt % to 12 wt % of the phosphorus atoms. In an exemplary embodiment, the DOPO-containing compound is represented by Formula (I):

Formula (I)

The diisocyanate compound can be an aliphatic diisocyanate. A weight average molecular weight of the diisocyanate compound ranges from 150 g/mol to 280 g/mol. The diisocyanate compound within this range of weight average molecular weight is beneficial for a grafting reaction. Specifically, the diisocyanate compound can be selected from the group consisting of: isophorone diisocyanate, 4,4'-diisocyanate dicyclohexylmethane, hexamethylene diisocyanate, and any combinations thereof. However, the present disclosure is not limited thereto.

As mentioned above, the DOPO-containing compound is reacted with the isocyanate group of the diisocyanate compound, so as to be grafted onto the benzoxazine resin. Therefore, a substituent represented by Formula (II) can be formed after the DOPO-containing compound represented by Formula (I) is reacted with the diisocyanate compound. In other words, the modified benzoxazine resin has the substituent represented by Formula (II).

Formula (II)

In the present disclosure, the benzoxazine resin is not limited to any specific type. Any benzoxazine resin that contains the DOPO group can be the modified benzoxazine resin of the present disclosure. For example, the benzoxazine resin can be selected from the group consisting of: a bisphenol A benzoxazine resin, a bisphenol F benzoxazine resin, a diamine benzoxazine resin, and any combinations thereof.

In an exemplary embodiment, when the benzoxazine resin is a bisphenol A modified benzoxazine resin that contains the substituent represented by Formula (II), the modified benzoxazine resin can be represented by Formula (III):

Formula (III)

In Formula (III), is formed by the diisocyanate compound after the grafting reaction, and varies due to use of different diisocyanate compounds.

In Formula (III), is formed by a primary aniline, and varies due to use of different types of primary aniline. An amino group of the primary aniline can be arranged at molecular ends or be grafted onto a molecular side chain. In addition to the amino group, the primary aniline can also contain other substituents, such as alkyl groups, halogen atoms, or a hydrogen atom. Specifically, the primary aniline can be selected from the group consisting of aniline, 4-methylaniline, 4-bromoaniline, and 4-isopropylaniline.

Figure 1:
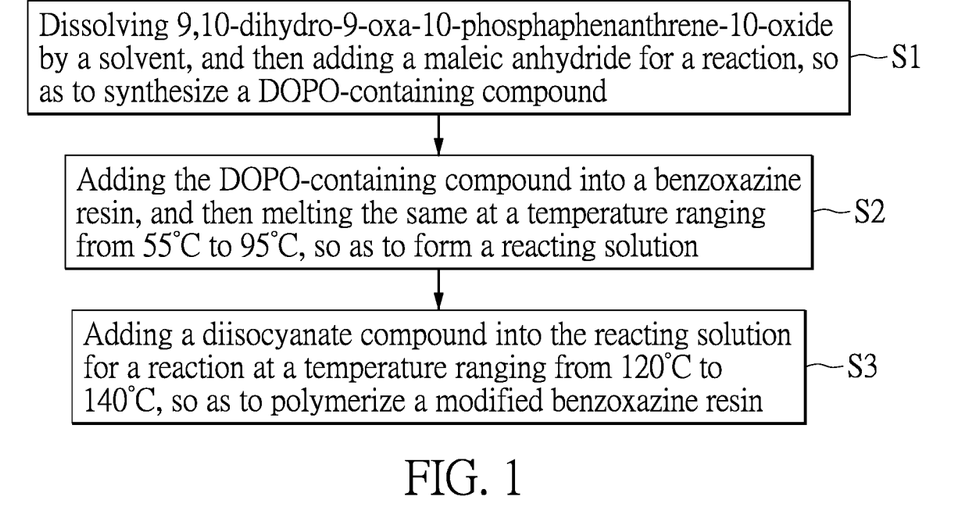
FIG. 1 is a flowchart showing steps for polymerization of a modified benzoxazine resin according to the present disclosure.

Referring to FIG. 1, specific steps for polymerization of the modified benzoxazine resin are illustrated.

In step S1, 9,10-dihydro-9-oxa-10-phosphaphenanthrene-10-oxide is dissolved by a solvent, and then reacted with a maleic anhydride to synthesize the DOPO-containing compound. In step S2, the DOPO-containing compound is added into the benzoxazine resin, and then melted at a temperature ranging from 55° C. to 95° C. to form a reacting solution. In step S3, the diisocyanate compound is added into the reacting solution, and then reacted at a temperature ranging from 120° C. to 140° C. to polymerize the modified benzoxazine resin.

A polymerization process of the DOPO-containing compound (corresponding to step S1) is illustrated in Synthesis Example 1. Polymerization processes of the modified benzoxazine resins of Samples 1 to 6 (corresponding to step S2 and step S3) are illustrated in Synthesis Example 2-1 to 2-6, respectively.

Synthesis Example 1

A heating device, a thermometer, a stirrer, a cooling pipe, and a nitrogen inlet pipe are mounted on a separable reaction flask which has a 3 L volume capacity. 400 ml of toluene and 400 ml of tetrahydrofuran (solvent) are added into the separable reaction flask. 216 g of 9,10-dihydro-9-oxa-10-phosphaphenanthrene 10-oxide is added into the separable reaction flask, and then stirred at 80° C. for dissolution.

Subsequently, 98 g of the maleic anhydride is gradually added into the separable reaction flask in 60 minutes under a nitrogen gas environment. The separable reaction flask is heated to a reflow temperature of the solvent (toluene and tetrahydrofuran) for a 6-hour reaction.

After the reaction is completed, the DOPO-containing compound (DOPO-MAH) represented by Formula (I) can be synthesized. Then, the DOPO-containing compound is cooled to a room temperature, filtrated, rinsed and dried. Specifically, the DOPO-containing compound is rinsed by using a mixture (400 g) of 50 vol % of tetrahydrofuran and 50 vol % of ethanol.

Synthesis Examples 2-1 to 2-6

200 g of the benzoxazine resin and 600 g of the toluene are added into the separable reaction flask, and then stirred at 50° C. to 70° C. for dissolution. The DOPO-containing compound (DOPO-MAH) prepared by Synthesis Example 1 is gradually added into the separable reaction flask in 20 minutes with continuous stirring, and then melted at a temperature ranging from 55° C. to 95° C., so as to form the reacting solution. Subsequently, the diisocyanate compound is added into the reacting solution, and reacted at a temperature ranging from 120° C. to 140° C. for 1 hour, so as to form the modified benzoxazine resin of the present disclosure.

The components and contents of the DOPO-containing compound, the diisocyanate compound, and the benzoxazine resin used in Synthesis Examples 2-1 to 2-6 are listed in Table 1. The diisocyanate compound can be isophorone diisocyanate (IPDI), methylene dicyclohexyl diisocyanate (HMDI), hexamethylene diisocyanate (HDI), or any combination thereof. The benzoxazine resin can be a bisphenol A benzoxazine resin (BPA-BZ), a bisphenol F benzoxazine resin (BPF-BZ), or a diamine benzoxazine resin (ODA-BZ, MDA-BZ).

TABLE 1

| (phr) | | Sample | | | | | |
|---|---|---|---|---|---|---|---|
| | | 1 | 2 | 3 | 4 | 5 | 6 |
| DOPO-containing compound | DOPO-MAH | 60 | 60 | 60 | 60 | 70 | 50 |
| Diisocyanate compound | IPDI | 5 | 5 | 5 | 5 | — | — |
| | HMDI | — | — | — | — | 5 | — |
| | HDI | — | — | — | — | — | 5 |
| Benzoxazine resin | BPA-BZ | 200 | — | — | — | 200 | 200 |
| | ODA-BZ | — | 200 | — | — | — | — |
| | BPF-BZ | — | — | 200 | — | — | — |
| | MDA-BZ | — | — | — | 200 | — | — |

Figure 2:
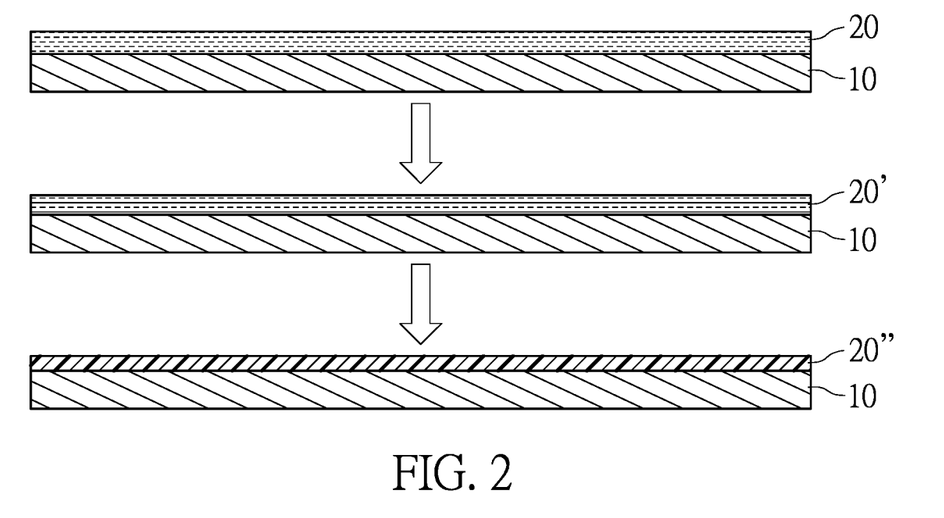
FIG. 2 is a schematic side view showing how a solidified body is manufactured according to the present disclosure.

Reference is made to FIG. 2, which is a schematic side view showing manufacturing of the solidified body according to the present disclosure.

The resin composition containing the modified benzoxazine resin is prepared. The resin composition is coated onto a metal substrate 10 for formation of a resin membrane 20. Subsequently, the resin membrane 20 is solidified at a temperature ranging from 70° C. to 200° C., so as to form a prepreg 20'. After the prepreg 20' is heat-pressed, a solidified body 20" can be obtained.

Figure 3:
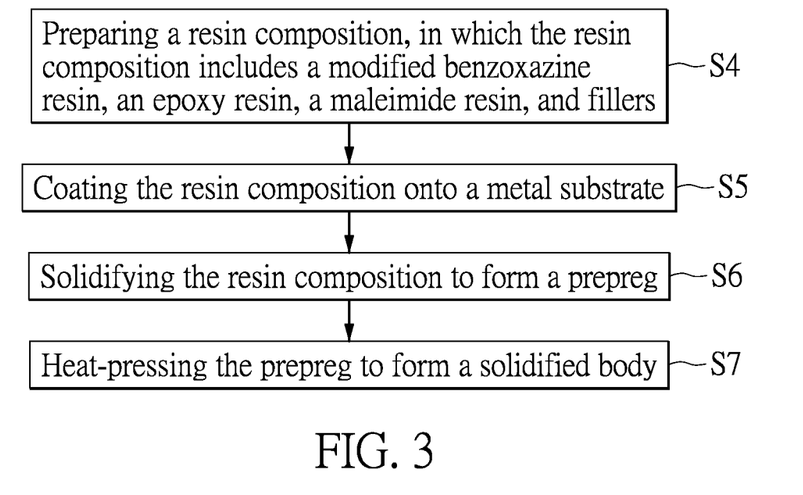
FIG. 3 is a flowchart of a method for manufacturing the solidified body according to the present disclosure.

Referring to FIG. 3, specific steps for manufacturing the solidified body are illustrated.

In step S4, the resin composition is prepared. The resin composition includes the modified benzoxazine resin, the epoxy resin, the maleimide resin, and the fillers. In step S5, the resin composition is coated onto a metal substrate. In step S6, the resin composition is solidified at a temperature ranging from to 200° C., so as to form a prepreg. In step S7, the prepreg is heat-pressed to form the solidified body.

Figure 4:
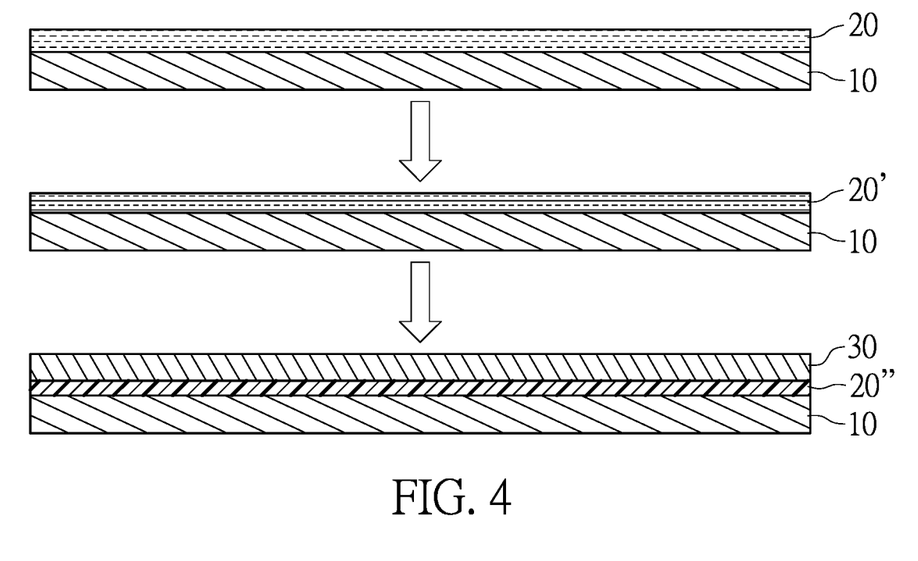
FIG. 4 is a schematic side view showing how a metal clad substrate is manufactured according to the present disclosure.

Reference is made to FIG. 4, which is a schematic side view showing manufacturing of the metal clad substrate according to the present disclosure.

The resin composition containing the modified benzoxazine resin is prepared. The resin composition is coated onto the metal substrate 10 for formation of the resin membrane 20. Subsequently, the resin membrane 20 is solidified at a temperature ranging from 70° C. to 200° C., so as to form the prepreg 20'. A printed circuit board is disposed on the prepreg 20', and then the printed circuit board and the prepreg 20' are heat-pressed, such that the prepreg 20' is formed into the solidified body 20" and the metal clad substrate can be obtained.

Figure 5:
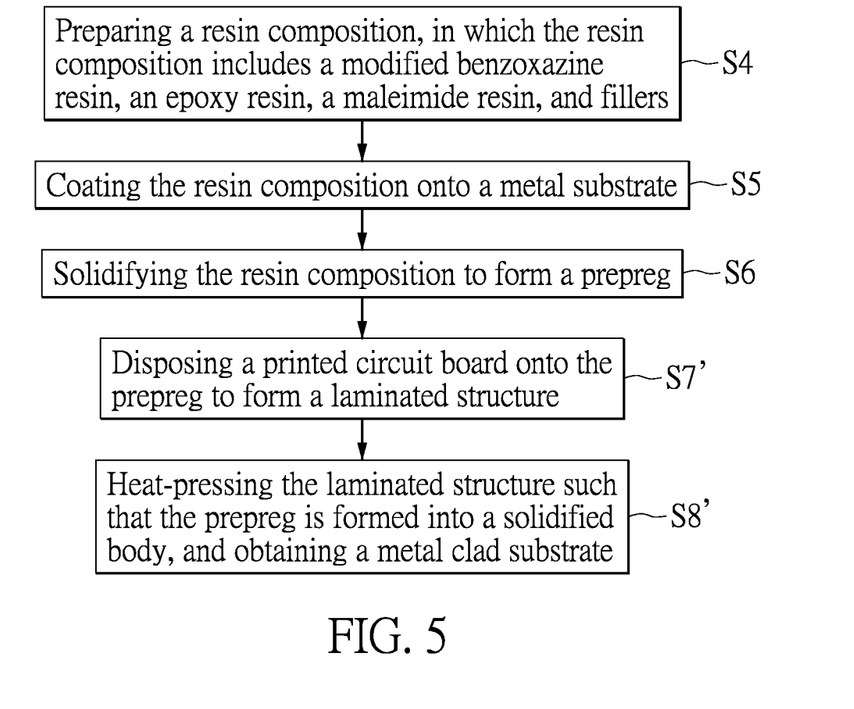
FIG. 5 is a flowchart of a method for manufacturing the metal clad substrate according to the present disclosure.

Referring to FIG. 5, specific steps for manufacturing the metal clad substrate are illustrated.

Steps S4 to S6 for manufacturing the metal clad substrate are the same as the steps S4 to S6 for manufacturing the solidified body, which will not be repeated herein. In step S7', after the formation of the prepreg (step S6), the printed circuit board is disposed on the prepreg to form a laminated structure. In step S8', the laminated structure is heat-pressed, such that the prepreg is formed into the solidified body and the metal clad substrate is obtained.

For manufacturing of the above-mentioned solidified body or metal clad substrate, the resin composition is formed into the solidified body after being solidified and heat-pressed. Since the amount of the DOPO group in the modified benzoxazine resin is controlled in the present disclosure, the thermal resistance and the flame resistance of the solidified body can be enhanced through an appropriate addition of the phosphorus atoms.

In order to prove the advantages of the solidified body and the metal clad substrate of the present disclosure, metal clad substrates of Examples 1 to 6 (E1 to E6) and Comparative Examples 1 to 4 (C1 to C4) are prepared according to the abovementioned steps.

Resin compositions of Examples 1 to 6 and Comparative Examples 1 to 4 include different components and contents of resins (as listed in Table 2). In this way, how properties of the metal clad substrates are influenced by the different resin compositions can be observed and compared. The difference between Examples 1 to 6 and Comparative Examples 1 to 4 is that the benzoxazine resins (BPA-BZ, ODA-BZ) added in Comparative Examples 1 to 4 are not modified to have the DOPO group.

Examples 1 to 6

The modified benzoxazine resin of at least one of Samples 1 to 6 and the maleimide resin listed in Table 2 are dissolved in 40 g of the solvent (butanone) to form a solution. Subsequently, the epoxy resin (which includes a cresol novolac epoxy resin (CNE), a bisphenol A novolac epoxy resin (BNE), and a bisphenol A epoxy resin (BPA)), a flexibilizer (liquid polybutadiene), and a flame retardant are added in the solution, and then the solution is stirred for dissolution. After the fillers (silicon dioxide) are added, the resin composition is prepared.

A E-type glass substrate (model: E2116) is immersed in the resin composition, is baked at a temperature of 80° C. for 3 minutes, and is further baked at a temperature of 180° C. for 7 minutes. After a drying process, the prepreg is obtained. Four sheets of the prepreg are laminated, and two metal layers are respectively disposed on two opposite sides of the laminated prepreg, such that the laminated structure is obtained. The laminated structure is heated and solidified, so as to obtain the metal clad substrate. During the heat-pressing process, the temperature is increased by a rising rate of 3° C./minute for reaching 200° C. to 220° C. The laminated structure is heat-pressed by a force of 15 kg/cm² (initial force: 8 kg/cm²) at a temperature ranging from 200° C. to 220° C. for 180 minutes.

Properties Test

Glass transition temperature (Tg): a glass transition temperature of the metal clad substrate is detected by use of a thermal mechanical analyzer (TMA).

Coefficient of thermal expansion (CTE): a coefficient of thermal expansion of the metal clad substrate along a z-axis and within a temperature range from 50° C. to 260° C. is detected by the thermal mechanical analyzer (TMA) according to the IPC-TM-650 2.4.24.5 standard.

Peeling strength: after the metal clad substrate is dried, a force for vertically peeling a copper foil (metal substrate) that has a width of 1/8 inches from the solidified body is measured.

Thermal resistance: after drying of the metal clad substrate, the metal clad substrate is immersed into a soldering furnace of 300° C. for 100 seconds, and the immersion is repeated for three times. If an appearance of the metal clad substrate is unchanged, a symbol "○" is shown in Table 2. If there is bubbling or bulging on the metal clad substrate, a symbol "x" is shown in Table 2.

Flame resistance: according to the UL94 flammability standard, flame resistance ratings of plastic materials are determined by measuring a self-ignition time, a self-ignition speed, and a state of particles falling from a test specimen of the plastic material that is subjected to a vertical burning test. From the least flame-resistant to most flame-resistant, the ratings are sequentially HB, V-2, V-1, V-0 and 5V (of which 5V is the highest flame resistance rating). In the test of UL94 flammability standard, the plastic material is burned vertically by the flame (with every ten seconds as a test cycle). In Step 1, the test specimen is put into the flame for 10 seconds and then removed. A continuous burning time (T1) of the test specimen after removal is measured. In Step 2, after the flame of the test specimen extinguishes, the test specimen is put into the flame for another 10 seconds and then removed. A continuous burning time (T2) of the test specimen after removal is measured. In Step 3, step 1 and step 2 are repeated several times for a calculation of an average value. In Step 4, the sum of T1+T2 is calculated. The requirements for the V-0 rating are as follows: the average of T1 and the average of T2 should not exceed 10 seconds, and the sum of T1 and T2 should not exceed 50 seconds.

Oily substance emergence test: cutting the metal clad substrate into a 10 cm square sample, and baking the sample at 200° C. for 120 minutes in an oven, so as to observe whether or not an oily substance emerges from the sample.

TABLE 2

|  |  | E1 | E2 | E3 | E4 | E5 | E6 | C1 | C2 | C3 | C4 |
|---|---|---|---|---|---|---|---|---|---|---|---|
| Cresol novolac epoxy resin | | 10 | 10 | 10 | 10 | 10 | 10 | 10 | 10 | 10 | 10 |
| Bisphenol A novolac epoxy resin | | 10 | 10 | 10 | 10 | 10 | 10 | 10 | 10 | 10 | 10 |
| Bisphenol A epoxy resin | | 10 | 10 | 10 | 10 | 10 | 10 | 10 | 10 | 15 | 15 |
| Benzoxazine resin | Sample 1 | 50 | — | — | — | — | — | — | — | — | — |
| | Sample 2 | — | 50 | — | — | — | — | — | — | — | — |
| | Sample 3 | — | — | 50 | — | — | — | — | — | — | — |
| | Sample 4 | — | — | — | 50 | — | — | — | — | — | — |
| | Sample 5 | — | — | — | — | 50 | — | — | — | — | — |
| | Sample 6 | — | — | — | — | — | 50 | — | — | — | — |
| | BPA-BZ | — | — | — | — | — | — | 50 | — | 50 | — |
| | ODA-BZ | — | — | — | — | — | — | — | 50 | — | 50 |
| Maleimide resin | | 5 | 5 | 5 | 5 | 5 | 5 | 5 | 5 | 5 | 5 |
| Flexibilizer | | 3 | 3 | 3 | 3 | 3 | 3 | 3 | 3 | 3 | 3 |
| Flame retardant | SPB-100 | 3 | 3 | 3 | 3 | 3 | 3 | 3 | 3 | 3 | 3 |
| | DOPO | — | — | — | — | — | — | 5 | 7.5 | 10 | — |
| Fillers | SiO₂ | 35 | 35 | 35 | 35 | 35 | 35 | 35 | 35 | 35 | 35 |
| Property test | | | | | | | | | | | |
| Glass transition temperature (° C.) | | 178 | 171 | 172 | 176 | 173 | 176 | 172 | 174 | 172 | 176 |
| Coefficient of thermal expansion (%) | | 2.8 | 2.5 | 2.5 | 2.9 | 2.8 | 2.6 | 2.9 | 2.5 | 2.7 | 2.6 |
| Peeling strength (lbf/in) | | 6.7 | 6.9 | 6.9 | 7.2 | 6.9 | 6.8 | 6.2 | 6.1 | 6.2 | 6.0 |
| Thermal resistance | | ○ | ○ | ○ | ○ | ○ | ○ | ○ | ○ | ○ | ○ |
| Flame resistance | | V0 | V0 | V0 | V0 | V0 | V0 | V0 | V0 | V0 | V0 |
| Sum of T1 + T2 (second) | | 24 | 32 | 23 | 27 | 24 | 21 | 45 | 34 | 19 | 87 |
| Oily substance emergence test | | Pass | Pass | Pass | Pass | Pass | Pass | Fail | Fail | Fail | Fail |

According to the results in Table 2, compared to Comparative Examples 1 to 4, the addition of the modified benzoxazine resin of the present disclosure can enhance the thermal resistance and the flame resistance. In addition, no oily substance emerges from the surface of the metal clad substrate, thereby enhancing the quality of the metal clad substrate.

The metal clad substrate of the present disclosure has good thermal resistance and good flame resistance. Specifically, the glass transition temperature of the metal clad substrate ranges from 170° C. to 185° C., and the coefficient of thermal expansion of the metal clad substrate along the z-axis ranges from 2.5% to 3.0%. Therefore, the metal clad substrate of the present disclosure can endure a higher processing temperature.

According to the results in Table 2, the epoxy resin used in the resin composition can include the cresol novolac epoxy resin (CNE), the bisphenol A novolac epoxy resin (BNE), and the bisphenol A epoxy resin (BPA). Based on a total weight of the epoxy resin being 100 wt %, an amount of the cresol novolac epoxy resin ranges from 30 wt % to 35 wt %, an amount of the bisphenol A novolac epoxy resin ranges from 30 wt % to 35 wt %, and an amount of the bisphenol A epoxy resin ranges from 30 wt % to 35 wt %.

Beneficial Effects of the Embodiment

In conclusion, in the resin composition and the metal clad substrate provided by the present disclosure, by virtue of "the resin composition including 40 phr to 60 phr of a modified benzoxazine resin," "the modified benzoxazine resin containing a DOPO group," and "an amount of the DOPO group ranging from 10 wt % to 20 wt %," the oily substance can be prevented from emerging from the surface of the metal clad substrate of the present disclosure.

Further, by virtue of "the modified benzoxazine resin being polymerized from a DOPO-containing compound, a diisocyanate compound, and a benzoxazine resin" or "the DOPO-containing compound being grafted onto a main chain of the benzoxazine resin via the diisocyanate compound," no oily substance emerges from the modified benzoxazine resin of the present disclosure.

Further, by virtue of "the modified benzoxazine resin containing 1 wt % to 2 wt % of phosphorus atoms" and "the DOPO-containing compound containing 6 wt % to 12 wt % of phosphorus atoms," the thermal resistance and the flame resistance of the resin composition and the metal clad substrate can be enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A resin composition, comprising:
   20 phr to 40 phr of an epoxy resin;
   40 phr to 60 phr of a modified benzoxazine resin, wherein the modified benzoxazine resin contains a DOPO group; wherein, based on a total weight of the modified benzoxazine resin being 100 wt %, an amount of the DOPO group ranges from 10 wt % to 20 wt %;
   2 phr to 10 phr of a maleimide resin; and
   25 phr to 50 phr of fillers.

2. The resin composition according to claim 1, wherein the modified benzoxazine resin contains 1 wt % to 2 wt % of phosphorus atoms.

3. The resin composition according to claim 1, wherein the modified benzoxazine resin is polymerized from a DOPO-containing compound, a diisocyanate compound, and a benzoxazine resin.

4. The resin composition according to claim 3, wherein the DOPO-containing compound is grafted onto a main chain of the benzoxazine resin via the diisocyanate compound.

5. The resin composition according to claim 3, wherein the DOPO-containing compound contains 6 wt % to 12 wt % of phosphorus atoms.

6. The resin composition according to claim 3, wherein the DOPO-containing compound is represented by Formula (I):

Formula (I)

7. The resin composition according to claim 3, wherein the diisocyanate compound is selected from the group consisting of: isophorone diisocyanate, 4,4'-diisocyanate dicyclohexylmethane, hexamethylene diisocyanate, and any combination thereof.

8. The resin composition according to claim 3, wherein the benzoxazine resin is selected from the group consisting of: a bisphenol A modified benzoxazine resin, a bisphenol F modified benzoxazine resin, a diamine modified benzoxazine resin, and any combination thereof.

9. The resin composition according to claim 1, wherein the modified benzoxazine resin has a substituent represented by Formula (II):

Formula (II)

10. A metal clad substrate, comprising:
    a metal substrate;
    a solidified body disposed on the metal substrate, wherein the solidified body is formed after solidification of a resin composition, and the resin composition includes:

20 phr to 40 phr of an epoxy resin, 40 phr to 60 phr of a modified benzoxazine resin, 2 phr to 10 phr of a maleimide resin, and 25 phr to 50 phr of fillers; wherein the modified benzoxazine resin contains a DOPO group; wherein, based on a total weight of the modified benzoxazine resin being 100 wt %, an amount of the DOPO group ranges from 10 wt % to 20 wt %; and
a printed circuit board disposed on the solidified body.

* * * * *